(12) United States Patent
Kim et al.

(10) Patent No.: US 9,947,957 B2
(45) Date of Patent: *Apr. 17, 2018

(54) SECONDARY BATTERY OF EXCELLENT PRODUCTABILITY AND SAFETY

(71) Applicant: LG CHEM, LTD., Seoul (KR)

(72) Inventors: Do Gyun Kim, Chungcheongbuk-do (KR); Dong-Myung Kim, Daejeon (KR); Dong Sub Lee, Icheon-si (KR); Sang Bong Nam, Cheonan-si (KR); Sang Sok Jung, Chungcheongbuk-do (KR)

(73) Assignee: LG Chem, Ltd. (KR)

( * ) Notice: Subject to any disclaimer, the term of this patent is extended or adjusted under 35 U.S.C. 154(b) by 371 days.

This patent is subject to a terminal disclaimer.

(21) Appl. No.: 13/906,471

(22) Filed: May 31, 2013

(65) Prior Publication Data

US 2013/0252055 A1    Sep. 26, 2013

Related U.S. Application Data

(63) Continuation of application No. PCT/KR2011/008921, filed on Nov. 22, 2011.

(30) Foreign Application Priority Data

Dec. 15, 2010   (KR) .................. 10-2010-0128270

(51) Int. Cl.
*H01M 10/04* (2006.01)
*H01M 2/12* (2006.01)
(Continued)

(52) U.S. Cl.
CPC ....... *H01M 10/0431* (2013.01); *H01M 2/043* (2013.01); *H01M 2/0417* (2013.01);
(Continued)

(58) Field of Classification Search
CPC ..................... H01M 2/1606–2/1666
See application file for complete search history.

(56) References Cited

U.S. PATENT DOCUMENTS 5,264,129 A * 11/1993 Simpson ............... B01D 24/12
                                                  210/150
5,654,114 A *  8/1997 Kubota ................ H01M 4/485
                                                  429/231.3
(Continued)

FOREIGN PATENT DOCUMENTS

CN     1897347 A    1/2007
CN     1992421 A    7/2007
(Continued)

OTHER PUBLICATIONS

International search report issued in PCT/KR2011/008921 dated Jun. 29, 2012.

*Primary Examiner* — Stephan Essex
(74) *Attorney, Agent, or Firm* — Lerner, David, Littenberg, Krumholz & Mentlik, LLP

(57) ABSTRACT

Disclosed is a secondary battery having a structure in which a jelly-roll having a cathode/separator/anode structure is mounted in a cylindrical battery case, wherein a plate-shaped insulating member is mounted on the top of the jelly-roll and the insulating member includes a perforated inlet enabling gas discharge and penetration of electrode terminals and a plurality of pores with a diameter of 100 μm or less provided over the entire surface of the insulating member.

7 Claims, 3 Drawing Sheets

(51) Int. Cl.
    *H01M 10/052*     (2010.01)
    *H01M 10/0587*     (2010.01)
    *H01M 2/04*     (2006.01)
    *H01M 2/36*     (2006.01)

(52) U.S. Cl.
    CPC .............. *H01M 2/12* (2013.01); *H01M 2/36* (2013.01); *H01M 10/0422* (2013.01); *H01M 10/052* (2013.01); *H01M 10/0587* (2013.01); *H01M 2220/20* (2013.01); *H01M 2220/30* (2013.01); *Y02E 60/122* (2013.01); *Y02T 10/7011* (2013.01)

(56) References Cited

U.S. PATENT DOCUMENTS

| | | |
|---|---|---|
| 2007/0020515 A1 | 1/2007 | Lee et al. |
| 2007/0154789 A1 | 7/2007 | Chang et al. |
| 2007/0154804 A1 | 7/2007 | Kim et al. |
| 2009/0054821 A1* | 2/2009 | Tanaka .................... B32B 27/02 602/45 |
| 2009/0123835 A1 | 5/2009 | Kim et al. |
| 2010/0055555 A1 | 3/2010 | Fukase et al. |
| 2011/0086265 A1 | 4/2011 | Suzuki |

FOREIGN PATENT DOCUMENTS

| | | |
|---|---|---|
| JP | 10-284046 A | 10/1998 |
| JP | 2004-241251 A | 8/2004 |
| JP | 2007-184234 A | 7/2007 |
| JP | 2008-53196 A | 3/2008 |
| JP | 2009-301892 A | 12/2009 |
| KR | 10-2007-0071242 A | 7/2007 |
| WO | WO 2009/150912 A1 | 12/2009 |

\* cited by examiner

SECONDARY BATTERY OF EXCELLENT PRODUCTABILITY AND SAFETY

CROSS REFERENCE TO RELATED APPLICATIONS

This application is a Continuation of PCT International Application No. PCT/KR2011/008921 filed on Nov. 22, 2011, which claims the benefit of Patent Application No. 10-2010-0128270 filed in the Republic of Korea on Dec. 15, 2010. The entire contents of all of the above applications are hereby expressly incorporated by reference into the present application.

TECHNICAL FIELD

The present invention relates to a secondary battery with superior manufacture processability and safety. More specifically, the present invention relates to a secondary battery having a structure in which a jelly-roll is mounted in a cylindrical battery case, wherein an insulating member is mounted on the jelly-roll and the insulating member includes a perforated inlet enabling gas discharge and penetration of electrode terminals and a plurality of pores with a diameter of 100 μm or less provided over the entire surface of the insulating member.

BACKGROUND ART

The development of techniques associated with mobile devices and increase in demand therefor have brought about rapid increase in the demand for secondary batteries as energy sources. Among secondary batteries, lithium secondary batteries with high energy density, high driving voltage and superior storage and lifespan characteristics are widely used as energy sources of various electric products including mobile devices.

Depending on the shape of battery case, the secondary battery may be divided into cylindrical and rectangular batteries mounted in cylindrical and rectangular metal cans, respectively, and a pouch-shaped battery mounted in a pouch-shaped case made of an aluminum laminate sheet. Of these, the cylindrical battery has advantages of relatively high capacity and superior structural stability. The electrode assembly mounted in the battery case is an electricity-generating device enabling charge and discharge that has a cathode/separator/anode laminate structure and is divided into a jelly-roll type in which an electrode assembly including a separator interposed between a cathode and an anode, each made of an active material-coated long sheet, is rolled, a stack-type in which a plurality of cathodes and a plurality of anodes are laminated in this order such that a separator is interposed between the cathode and the anode and a stack/folding type which is a combination of a jelly-roll type and a stack type. Of these, the jelly-roll-type electrode assembly has advantages of easy manufacture and high energy density per weight.

In this regard, a conventional cylindrical secondary battery is shown in FIG. 1. An insulating member generally used for the cylindrical secondary battery is shown in plan views in FIGS. 2 and 3.

Referring to the drawings, a cylindrical secondary battery 100 is manufactured by mounting a jelly-roll type (rolled-type) electrode assembly 120 in a battery case 130, injecting an electrolytic solution into the battery case 130 and coupling a cap assembly 140 provided with an electrode terminal (for example, a cathode terminal; not shown) to the open top of the case 130.

The electrode assembly 120 is obtained by inserting a separator 123 between a cathode 121 and an anode 122 and rolling the resulting structure in a round shape. A cylindrical center pin 150 is inserted into the core (center) of the jelly-roll. The center pin 150 is generally made of a metal to impart a predetermined strength and has a hollow-shaped cylindrical structure of a roundly bent plate material. Such a center pin 150 sets and supports the electrode assembly and serves as a passage, enabling discharge of gas generated by internal reaction during charge and discharge and operation.

In addition, a plated-shaped insulating member 180a is mounted on the top of the electrode assembly 120, and provided in the center thereof with an inlet 181a communicating with the through hole 151 of the center pin 150 so that gas is discharged and the cathode tap 142 of the electrode assembly 120 is connected to the cap plate 145 of the cap assembly 140.

However, the insulating member 180a arranged on the top of the jelly-roll is a structure that blocks a passage through which an electrolytic solution permeates into a battery in the process of injecting an electrolytic solution into the battery. For this reason, the electrolytic solution permeates into the battery only through the inlet 181a communicating with the center pin 150 and a region excluding the insulating member 180a, thus disadvantageously requiring a long time for injection of electrolyte and consequently causing deterioration in production efficiency.

In order to improve permeability of the electrolytic solution, as shown in FIG. 3, a partial connection member 180b having a structure in which a plurality of through pores 182b are formed around an inlet 181b is suggested.

However, this structure is found to have serious problems in terms of safety. That is, conductive impurity particles such as metal powders generated in the process of manufacturing and/or assembling the cap assembly 140, the battery case 130 and the like are permeated into the electrode assembly 120 through the through pores 182b that are perforated in the insulating member 180b, thus disadvantageously causing occurrence of short circuit or deterioration in battery lifespan.

Accordingly, there is an increasing need for secondary batteries that maintain electrical safety and enhance injection processability of electrolytic solution.

DISCLOSURE

Technical Problem

Therefore, the present invention has been made to solve the above problems and other technical problems that have yet to be resolved.

It is an object of the present invention to provide a secondary battery that improves permeation of an electrolytic solution and enhances safety, performance and manufacture processability of a battery due to application of an insulating member with a novel structure.

Technical Solution

In accordance with one aspect of the present invention, provided is a secondary battery having a structure in which a jelly-roll having a cathode/separator/anode structure is mounted in a cylindrical battery case, wherein a plate-shaped insulating member is mounted on the top of the jelly-roll and the insulating member includes a perforated inlet enabling gas discharge and penetration of electrode terminals and a plurality of pores with a diameter of 100 μm or less provided over the entire surface of the insulating member.

Due to the insulating member mounted on the top of the jelly-roll, the cylindrical secondary battery is considerably preferable in that, when an electrolytic solution is injected, the electrolytic solution permeates over the entire surface of the insulating member, solution injection is greatly improved and occurrence of short circuit can be prevented as compared to conventional insulating members including through pores with a relatively large diameter. These facts can be confirmed by the following test results.

Any material may be used for the insulating member without particular limitation so long as it has insulating properties. For example, the material for the insulating member may be an electrically insulating polymer resin or an electrically insulating polymer composite and, specifically, the polymer resin is selected from the group consisting of polypropylene (PP), polystyrene (PS), polyethylene terephthalate (PET), natural rubbers and synthetic rubbers.

The insulating member may be a porous non-woven structure, if necessary, in order to facilitate permeation of electrolytic solution due to inherent characteristics of materials and the shape of sheets.

As mentioned above, the pores of the insulating member have a size that imparts electrically insulating properties, inherent property of the insulating member, and enables the electrolytic solution to permeate into the insulating member when the electrolytic solution is injected. Accordingly, the insulating member according to the present invention has fine pores. As defined above, the insulating member includes pores with a diameter of 100 μm or less.

As was confirmed by the present inventors, it is not preferable that the pores have a diameter larger than 100 μm since fine metal particles generated from the cap assembly, battery case and the like permeate into the jelly-roll in the process of battery assembly through the pores of the insulating member, and short circuit may thus be generated.

Preferably, the pores have, for example, a diameter of 10 μm to 100 μm to provide high permeation of electrolytic solution.

In a preferred embodiment, the pores may be spaced from one another by a predetermined distance throughout the entire surface of the insulating member.

For example, the predetermined distance may be 10 μm to 100 μl and the distance may mean a distance between pores perforating the insulating member.

The insulating member preferably has a thickness of 0.1 mm to 0.5 mm. When the thickness of the insulating member is excessively small, the insulating member cannot sufficiently exert inherent electrical insulation and on the other hand, when the thickness is Disadvantageously, the secondary battery ac excessively large, a decrease in size of the jelly-roll is caused in a battery case having the same dimensions and battery capacity is thus disadvantageously decreased. The present invention may be also applied to a lithium secondary battery manufactured by impregnating a lithium-containing electrolytic solution in the jelly-roll.

The present invention also provides a device comprising the secondary battery as a power source.

Preferably, the device according to the present invention may be used for mobile devices such as cellular phones and portable computers and electric vehicles (EVs), hybrid electric vehicles (HEVs), plug-in hybrid electric vehicles (PHEV), and systems for power storage in terms of superior lifespan and safety.

BRIEF DESCRIPTION OF THE DRAWINGS

The above and other objects, features and other advantages of the present invention will be more clearly understood from the following detailed description taken in conjunction with the accompanying drawings, in which.

BEST MODE

Now, the present invention will be described in more detail with reference to the following examples. These examples are provided only for illustrating the present invention and should not be construed as limiting the scope and spirit of the present invention.

Figure 4:
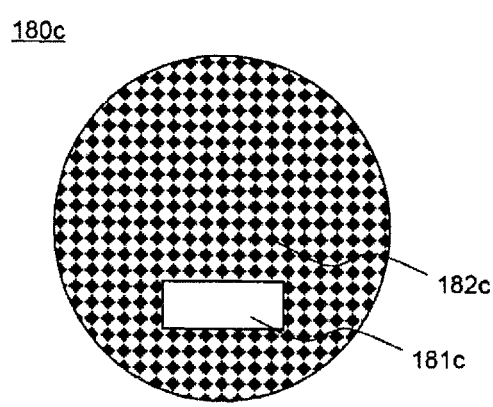
FIG. 4 is a plan view illustrating an insulating member according to one embodiment of the present invention.

FIG. 4 is a plan view schematically illustrating an insulating member according to one embodiment of the present invention.

Figure 1:
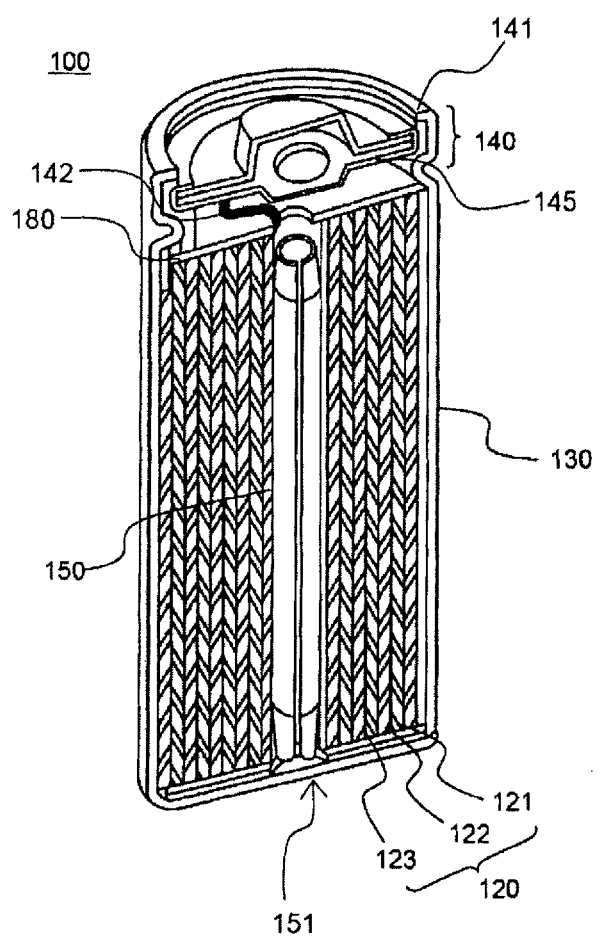
FIG. 1 is a representative sectional schematic view illustrating a cylindrical secondary battery.

Referring to FIGS. 4 and 1, a secondary battery 100 has a structure in which a jelly-roll 120 having a structure of cathode 121/separator 123/anode 122 is mounted in a cylindrical battery case 130, wherein an insulating member 180 is mounted on the top of the jelly-roll 120.

The insulating member 180c is composed of polyethylene terephthalate (PET) with a thickness of about 0.4 mm, is provided at one side thereof with an inlet 181c and is provided throughout the entire surface thereof with a plurality of micropores 182c having a diameter of 10 to 30 μm that are spaced from one another by a predetermined distance.

Accordingly, through the plurality of micropores 182c, an electrolytic solution permeates into the entire surface of the insulating member 180c when injected, thus causing considerable improvement in solution injection and preventing occurrence of short circuit.

Now, the present invention will be described in more detail with reference to the following examples. These examples are provided only for illustrating the present invention and should not be construed as limiting the scope and spirit of the present invention.

Example 1

An insulating member having a thickness of 0.4 mm in which a rectangular inlet having a width of 6 mm and a length of 2.5 mm was perforated at one side thereof and a plurality of micropores were uniformly distributed by a predetermined distance of about 10 to 30 μm was manufactured using polypropylene, as shown in FIG. 4. Then, the insulating member was mounted on the top of a jelly-roll in which a cathode/separator/anode is rolled based on a center pin and a cylindrical secondary battery with a 18650 standard (diameter 18 mm, length 65 mm) was manufactured in a state that fine metal powders generated in the process of battery assembly were arranged on the insulating member.

Example 2

An insulating member and a secondary battery were manufactured in the same manner as in Example 1 except that a plurality of micropores having a diameter of 100 μm were uniformly distributed by a predetermined distance of about 120 μm over the entire surface of the insulating member.

Comparative Example 1

Figure 2:
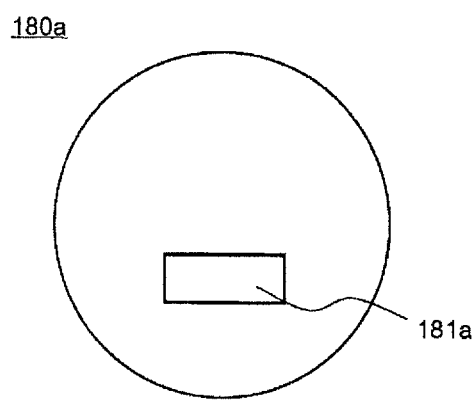
FIG. 2 is a plan view illustrating an insulating member used for the secondary battery of FIG. 1.

An insulating member and a secondary battery were manufactured in the same manner as in Example 1 except that a plurality of pores was not included, as shown in FIG. 2.

Comparative Example 2

Figure 3:
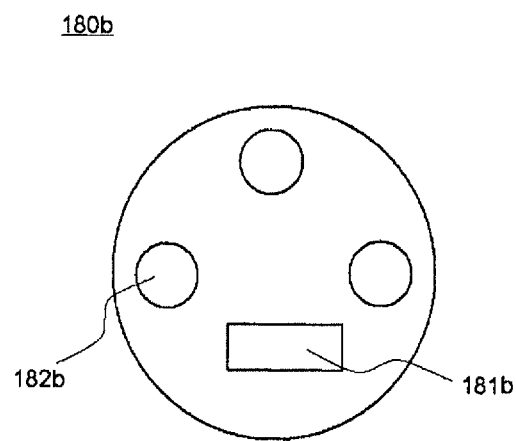
FIG. 3 a plan view illustrating another insulating member used for the secondary battery of FIG. 1.

An insulating member and a secondary battery were manufactured in the same manner as in Example 1 except that three through pores with a diameter of 2.5 mm were formed, as shown in FIG. 3.

Comparative Example 3

An insulating member and secondary battery were manufactured in the same manner as in Example 1 except that a plurality of micropores having a diameter of 150 μm were uniformly distributed by a predetermined distance of about 120 μm over the entire surface of the insulating member.

Test Example 1

The secondary batteries manufactured in Examples 1 and 2 and Comparative Examples 1 to 3 were subjected to electrolytic solution impregnation testing. The results are shown in Table 1 below. The electrolytic solution impregnation testing was carried out by injecting a 1M LiPF$_6$ carbonate electrolytic solution into the manufactured cylindrical battery case, measuring a time taken until impregnation ratio of the jelly-roll reached 100%, repeating this process four times and calculating an average of the four values. In addition, a cap assembly was welded to the open top of the manufactured secondary battery to produce 10 samples. The samples were subjected to charge and discharge testing and short circuit was confirmed. The results are shown in Table 1 below.

TABLE 1

|  | Impregnation time (sec) | Time shortage ratio (%) (based on Comp. Ex. 1) | Number of short-circuited batteries (number) | Short circuit ratio (%) |
| --- | --- | --- | --- | --- |
| Ex. 1 | 304 | 56 | 0 | 0 |
| Ex. 2 | 311 | 55 | 0 | 0 |
| Comp. Ex. 1 | 698 | 0 | 2 | 20 |
| Comp. Ex. 2 | 538 | 23 | 4 | 40 |
| Comp. Ex. 3 | 301 | 57 | 1 | 10 |

As can be seen from Table 1, the batteries of Examples 1 and 2 according to the present invention had considerably shortened electrolytic solution impregnation time, as compared to Comparative Example 1. That is, it can be seen that the electrolytic solution can be efficiently permeated through a plurality of micropores in the insulating member.

The battery of Comparative Example 2 exhibited improved impregnation, but increased short circuit, as compared to the battery of Comparative Example 1, the battery of Comparative Example 3 also exhibited impregnation comparable to Examples 1 and 2, but exhibited higher short circuit rate. The reason for this was that metal powders permeated into relatively large pores and short circuit was induced inside the jelly-roll.

On the other hand, the battery of Comparative Example 1 exhibited a high short circuit rate as compared to the batteries of Examples 1 and 2, although the battery of Comparative Example 1 including the insulating member mounted thereon was not provided with perforated micropores, as shown in Examples 1 and 2.

The reason for the high short circuit rate is believed to be due to the fact that, in the batteries of Examples 1 and 2, movement of metal powders is suppressed when metal powders are entrapped in the micropores, but, in the battery of Comparative Example 1, metal powders are freely moved on the smooth surface of the insulating member and move to the jelly-roll through the circumference of the inlet or insulating member.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As apparent from the afore-going, the secondary battery according to the present invention includes an insulating member provided over the entire surface thereof with a plurality of pores having a predetermined size or less, thereby advantageously preventing occurrence of short circuit, enabling the electrolytic solution to permeate throughout the insulating member, thus advantageously ultimately greatly improving safety, performance, lifespan and manufacture processability of battery.

The invention claimed is:

1. A secondary battery having a structure in which a jelly-roll having a cathode/separator/anode structure is mounted in a cylindrical battery case,
   wherein a plate-shaped insulating member is single-layered and mounted on the top of the jelly-roll,
   wherein the insulating member includes a perforated inlet enabling gas discharge and penetration of electrode terminals, and a plurality of pores with a diameter of 100 μm or less provided over the entire surface of the insulating member,
   wherein the insulating member has a thickness of 0.4 to 0.5 mm,
   wherein the insulating member is made of polyethylene terephthalate (PET),
   wherein the pores of the insulating member have a size of 10 μm to 100 μm,
   wherein the pores are spaced from one another by a predetermined distance over the entire surface of the insulating member such that the electrolyte is evenly distributed through the insulating member, and
   wherein the predetermined distance is 10 μm to 100 μm.

2. The secondary battery according to claim 1, wherein the insulating member has a non-woven structure.

3. The secondary battery according to claim 1, wherein the pores of the insulating member have a size allowing an electrolytic solution to pass through the pores when the electrolytic solution is injected.

4. The secondary battery according to claim 1, where the battery is a lithium secondary battery.

5. A device comprising the secondary battery according to claim 1 as a power source.

6. The device according to claim 5, wherein the device is selected from a cellular phone, a portable computer, an electric vehicle (EV), a hybrid electric vehicle (HEV), a plug-in hybrid electric vehicle (PHEV) and a device for power storage.

7. The secondary battery according to claim 1, wherein an entire upper surface of the insulator body is planar.

\* \* \* \* \*